United States Patent
Chen

(10) Patent No.: US 9,270,160 B2
(45) Date of Patent: Feb. 23, 2016

(54) REPETITIVE SERVOMECHANISM CONTROLLER FOR UNINTERRUPTIBLE POWER SUPPLY SYSTEM

(71) Applicant: Liebert Corporation, Columbus, OH (US)

(72) Inventor: Xian Chen, Columbus, OH (US)

(73) Assignee: Liebert Corporation, Columbus, OH (US)

( * ) Notice: Subject to any disclaimer, the term of this patent is extended or adjusted under 35 U.S.C. 154(b) by 0 days.

(21) Appl. No.: 14/541,667

(22) Filed: Nov. 14, 2014

(65) Prior Publication Data

US 2015/0155793 A1   Jun. 4, 2015

Related U.S. Application Data

(60) Provisional application No. 61/911,600, filed on Dec. 4, 2013.

(51) Int. Cl.
*H02M 5/45* (2006.01)
*H02M 1/12* (2006.01)
*H02J 9/00* (2006.01)
*H02M 7/537* (2006.01)

(52) U.S. Cl.
CPC .. *H02M 1/12* (2013.01); *H02J 9/00* (2013.01); *H02M 7/537* (2013.01)

(58) Field of Classification Search
CPC ........... H02M 1/12; H02M 7/537; H02J 9/00; H02P 23/0009

USPC .......................................................... 363/37
See application file for complete search history.

(56) References Cited

U.S. PATENT DOCUMENTS 6,466,465 B1   10/2002   Marwali
6,917,124 B2*  7/2005   Shetler, Jr. .............. H02J 9/061
                                                          307/66

OTHER PUBLICATIONS

"State-Feedback-with-Integral Control plus Repetitive Control for UPS Inverters", Zhang et al. IEEE, 2005.
"Perfect Control of the Robust Servomechanism Problem", Davidson et al., IEEE Transactions on Automatic Control USA, vol. AC-32, No. 8, Aug. 1987.
"Adaptive Repetitive Control of PWM Inverters for Very Low THD AC-Voltage Regulation with Unknown Loads", Ying-Yu Tzou et al., IEEE Transactions on Power Electronics, Institute of Electrical and Electronics Engineers, USA, vol. 14, No. 5, Sep. 1999.
Notification of International Search Report and Written Opinion of the International Searching Authority for PCT/US2014/065915, mailed Feb. 11, 2015.

* cited by examiner

*Primary Examiner* — Adolf Berhane
*Assistant Examiner* — Afework Demisse
(74) *Attorney, Agent, or Firm* — Harness, Dickey & Pierce, P.L.C.

(57) ABSTRACT

A repetitive servomechanism controller for a UPS system has an inner control loop and an outer control loop. The inner control loop regulates inverter current and the outer control loop regulates inverter voltage. The outer control loop includes a repetitive controller in combination with a harmonic servomechanism controller and a feed-forward controller.

6 Claims, 4 Drawing Sheets

Converting to the dq0 Stationary Reference Frame

$F_{qd0\_s} = K \cdot F_{abc}$    where $F_{abc}$ is either three phase currents or voltages in the abc reference frame,
$F_{abc} = K^{-1} \cdot F_{qd0\_s}$    and $\Theta$ is any arbitrary reference angle. Typically $\Theta = 0$ and so K becomes $$K(\Theta) = \frac{2}{3} \begin{bmatrix} \cos(\Theta) & \cos\left(\Theta - \frac{2\pi}{3}\right) & \cos\left(\Theta - \frac{2\pi}{3}\right) \\ \sin(\Theta) & \sin\left(\Theta - \frac{2\pi}{3}\right) & \sin\left(\Theta - \frac{2\pi}{3}\right) \\ \frac{1}{2} & \frac{1}{2} & \frac{1}{2} \end{bmatrix} \quad K(0) = \frac{2}{3} \begin{bmatrix} 1 & -\frac{1}{2} & -\frac{1}{2} \\ 0 & -\frac{\sqrt{3}}{2} & \frac{\sqrt{3}}{2} \\ \frac{1}{2} & \frac{1}{2} & \frac{1}{2} \end{bmatrix}$$

$F_{qd0\_s}$ is either currents or voltages in dq0 stationary reference frame

*Fig-5*

REPETITIVE SERVOMECHANISM CONTROLLER FOR UNINTERRUPTIBLE POWER SUPPLY SYSTEM

CROSS-REFERENCE TO RELATED APPLICATIONS

This application claims the benefit of U.S. Provisional Application No. 61/911,600, filed on Dec. 4, 2013. The entire disclosure of the above application is incorporated herein by reference.

FIELD

The present disclosure relates to control of uninterruptible power supply systems, and more particularly, to repetitive servomechanism control of uninterruptible power supply ("UPS") systems.

BACKGROUND

This section provides background information related to the present disclosure which is not necessarily prior art.

FIG. 1 is a basic block diagram of an example of a prior art uninterruptible power supply ("UPS") system 100. UPS system 100 includes a rectifier/charger 102, a battery 104, a DC bus 106, an inverter 108, a bypass switch 110, a control module 112, and an output transformer 114. It should be understood that some UPS systems do not include an output transformer, and that the source of back-up DC power may be other than a battery, in which case rectifier/charger 102 would not include a charger. It should also be understood that rectifier/charger 102 may only include the rectifier and UPS system 100 have a separate charger. When UPS system 100 is operating in a double conversion mode, alternating current ("AC") power is supplied at an input 116 of UPS system 100. Rectifier/charger 102 converts the incoming AC power to direct current ("DC") power. This DC power is supplied to battery 104 to charge the battery. The DC power is also supplied to the DC bus 106 which is coupled to an input of inverter 108. Inverter 108 converts the DC power to AC output power that is then supplied to a load 118 via the output transformer 114. If the normal AC power source fails, battery 104 provides power to the DC bus 106 which is converted by inverter 108 to AC output power. In some cases, UPS system 100 is switched to a bypass mode where bypass switch 110 is closed. AC power then flows directly from input 116 to load 118 via output transformer 114 (or directly to load 118 in UPS systems not having an output transformer). UPS system 100 may be switched to the bypass mode when a component of UPS system 100 in the double conversion power flow path fails, such as rectifier/charger 102 or inverter 108, or when the quality of AC power source is sufficient that it can be used to directly power load 118 without being conditioned through the double conversion path.

Control module 112 controls the rectifier/charger 102, inverter 108, and bypass switch 110. Control module 112 monitors the input and output voltages and currents and controls the rectifier/charger 102 to charge the battery and regulate the DC power including the bus voltage and also controls inverter 108 to regulate the AC output power including the AC voltage.

A simple repetitive controller for UPS systems is a good controller for harmonic rejection with various loads, especially for nonlinear loads. But an inherent disadvantage of repetitive control is that it can't provide fast, sub-cycle response, which is one of the most important features of UPS systems to not only maintain a nice sinusoidal voltage, but also provide fast transient responses. Another disadvantage of repetitive control is that it's difficult to stabilize without sacrificing the steady state voltage performance.

Repetitive control is a control method specifically used in dealing with periodic signals. It uses the periodicity of the reference or disturbance to provide a good harmonic rejection. As it is apparent to those skilled in art, the discrete transfer function of a repetitive controller, is shown below in:

$$RPC(Z)=Z^{\hat{}}(-(N-k))/(1-[(Q(Z) \cdot Z)]^{\hat{}}(-N))*Kopt*S(Z)*Z^{\hat{}}(-k)$$ (Equation 1. Discrete Transfer Function of a Repetitive Controller)

where Q(Z) is a constant gain smaller than 1, N is the number of samples per cycle at a fixed sample rate, S(Z) is a compensator, and Kopt is the optimized gain for the best transient and steady state performance of the control loop. Z is the symbol for Z-transformation, $Z=e^{jwt}$, where, $w=2*\pi*T$, $T=1/fs$ is the sampling period and fs is the sampling rate. k is the kth number of all samples in a sampling period T.

One of the disadvantages of the repetitive controller is that it's difficult to stabilize with various types of load. The gain Q(Z) shown in Equation 1 above is the key to stabilizing a repetitive controller. Q(Z) must be smaller than 1 and the smaller the gain, the more stable the controller is with various types of load. However, the smaller the Q(Z) gain, the less accurate the steady state controller's performance is. So it's difficult to have a robust stable repetitive controller for various types of load without sacrificing the steady state controller's performance.

Another inherent disadvantage of the repetitive controller is that it can't provide fast, sub-cycle response, which is one of the most important feature of UPS systems. It's critical that a UPS system respond quickly at the time of a utility power outage and provide a fast transient response.

SUMMARY

This section provides a general summary of the disclosure, and is not a comprehensive disclosure of its full scope or all of its features.

In accordance with an aspect of the present invention, a repetitive servomechanism controller for a UPS system has an inner control loop and an outer control loop. The inner control loop regulates inverter current and the outer control loop regulates inverter voltage. The outer control loop includes a repetitive controller in combination with a harmonic servomechanism controller and a feed-forward controller.

In an aspect, the inner control loop controls output current of an inverter of the uninterruptible power supply system using a discrete sliding mode current controller of the inner control loop with a PWM voltage signal generated at an output of the discrete sliding mode current controller which is coupled to a PWM drive signal generator that generates PWM drive signals for controlling semiconductor switching devices of the inverter with the PWM drive signals each having a duty cycle determined by a level of the PWM voltage signal. The outer control loop includes an output summer having inputs coupled to respective outputs of each of the feed-forward controller, the repetitive controller and the servomechanism controller. An output of the output summer is coupled to an input of the inner control loop. An input summer sums an output voltage of the inverter and a reference voltage to generate an error signal that is provided to an input of the repetitive controller and to an input of the servomechanism controller. The feed-forward controller has an input which receives the reference voltage.

In an aspect, the repetitive controller is configured to eliminate all harmonics and a frequency compensator of the servomechanism controller is configured as a compensator of only fundamental frequency.

In an aspect, the repetitive controller is configured to eliminate all harmonics by having a transfer function defined by the equation $RPC(Z)=Z^{(-(N-k))}/(1-[(Q(Z)\cdot Z)]^{(-N)})*Kopt*S(Z)*Z^{(-k)}$ where $Q(Z)$ is a constant gain smaller than 1, N is a number of samples per cycle at a fixed sample rate, $S(Z)$ is a compensator, Kopt is an optimized gain for best transient and steady state performance of control loop of the repetitive controller, Z is a symbol for Z-transformation, $Z=e^{jwt}$, where, $w=2*\pi*T$, $T=1/fs$ is a sampling period and fs is a sampling rate, and k is a kth number of all samples in a sampling period T.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 shows the conversion equation for converting abc three phase to the dq0 reference frame.

Corresponding reference numerals indicate corresponding parts throughout the several views of the drawings.

DETAILED DESCRIPTION

Example embodiments will now be described more fully with reference to the accompanying drawings.

Figure 2:
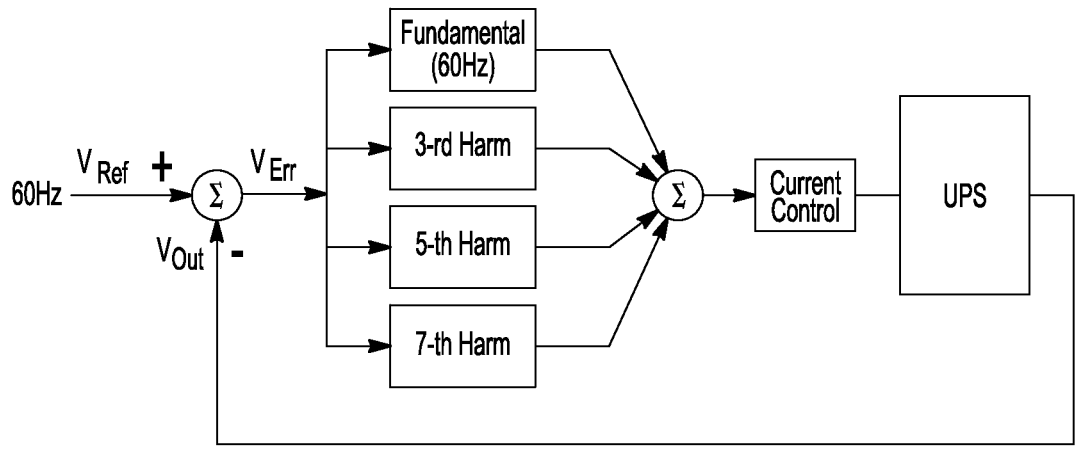
FIG. 2 is a basic block diagram of a prior art harmonic servomechanism controller.
Figure 3:
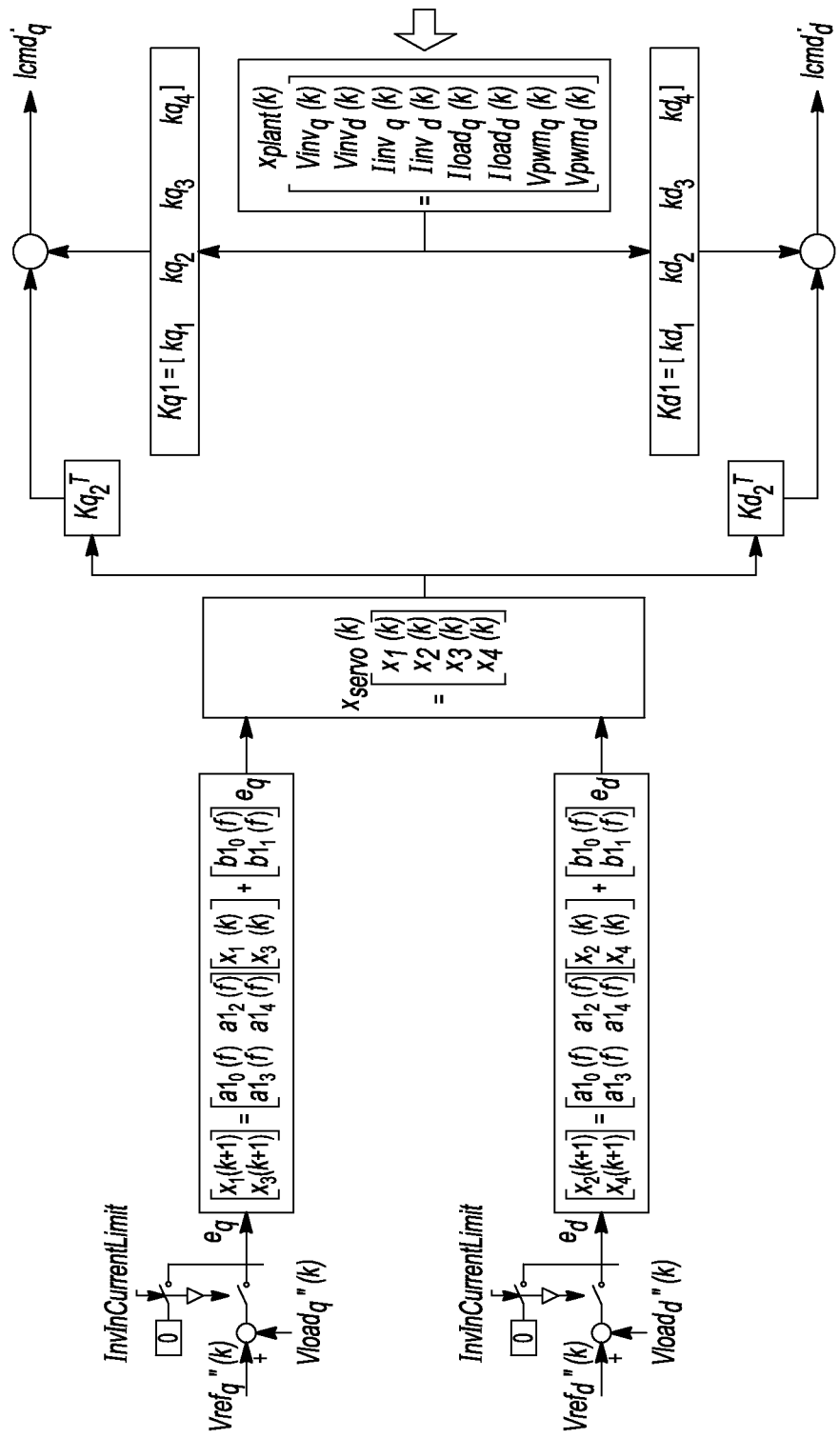
FIG. 3 is a basic block diagram of a harmonic servomechanism controller in accordance with an aspect of the present disclosure having a frequency compensator that is a compensator of fundamental frequency only.

In accordance with an aspect of the present disclosure, a repetitive controller having the transfer function of Equation 1 above is combined with the harmonic servomechanism controller described in U.S. Pat. No. 6,917,124 for "Uninterruptible Power Supply," FIGS. 26-FIG. 33 and accompanying description in particular. The entire disclosure of U.S. Pat. No. 6,917,124 is incorporated by reference. (A servomechanism (sometimes shortened to servo) controller as that term is used herein is an automatic controller that uses error-sensing negative feedback to correct the performance of the device being controlled.) One advantage of this harmonic servomechanism controller is that it is easier to stabilize than repetitive controllers. By combining the repetitive controller having the transfer function of Equation 1 above with this harmonic servomechanism controller, one of the disadvantages of the repetitive controller can be overcome. However, because the repetitive controller eliminates all harmonics, the harmonic servomechanism controller only needs a compensator of fundamental frequency. FIG. 2 is a simplified block diagram of the harmonic servomechanism controller shown in FIGS. 32 and 33 of U.S. Pat. No. 6,917,124. FIG. 3 is a block diagram of a modification of this harmonic servomechanism controller in accordance with an aspect of the present disclosure so that the frequency compensator of this modified harmonic servomechanism controller is a compensator of fundamental frequency only. In FIG. 3, there are two lines of equations. The first line is for the Q axis and the second line is for the D axis, where the Q and D axes are the result of abc three phase converted to the dq0 stationary reference frame. FIG. 5 shows the conversion equation for converting abc three phase to the dq0 reference frame. The D and Q axis utilize the same equations, so what follows are definitions for generic parameters and applicable to the equations of both the D and Q axes. Vref"(k) is the reference voltage command at sample k; Vload"(k) is the load voltage measurement at sample k; e is the calculated err=Vref"(k)−Vload"(k); The equation in the harmonic servo compensator block is the state space equation for the servo controller. Xservo(k) is calculated by solving this state space equation. Kq1, Kq2, Kd1 and Kd2 are the gains for the servo controller and are based on tuning results. Xplant(k) is the array of measured voltages and currents at sample k. Vinv(k) is measured inverter voltage (or load voltage) at sample k, Iinv(k) is measured inverter current at sample k, Iload(k) is measured load current at sample k, Vpwm(k) is the PWM voltage command at sample k. Icmd is the current command generated from the servo voltage controller. Note the Xplant(k) can vary depends on what kind electrical components the controlled system has, for example, if the system has an output transformer.

In accordance with an aspect of the present disclosure, a repetitive controller having the transfer function of Equation 1 is combined with the harmonic servomechanism controller of FIG. 3 together along with a feed-forward controller to improve transient response. Doing so provides a robust and reliable servomechanism controller that not only provide fast transient response, but also a nice steady state sine-wave output. The feed-forward controller's equation can be simply expressed as following: Vfeed−forward=Kff*V"ref. Where Kff is the feed-forward controller's gain. Vref is the reference voltage command for output voltage. It should be understood that the reference to the repetitive controller, harmonic servomechanism controller and feed-forward controller is to their respective control functions and does not mean that they are separate control devices. While these control functions may be implemented in separate control devices, they may also be implemented together in the same control device, such as a digital signal processor or microprocessor as discussed below.

Figure 4:
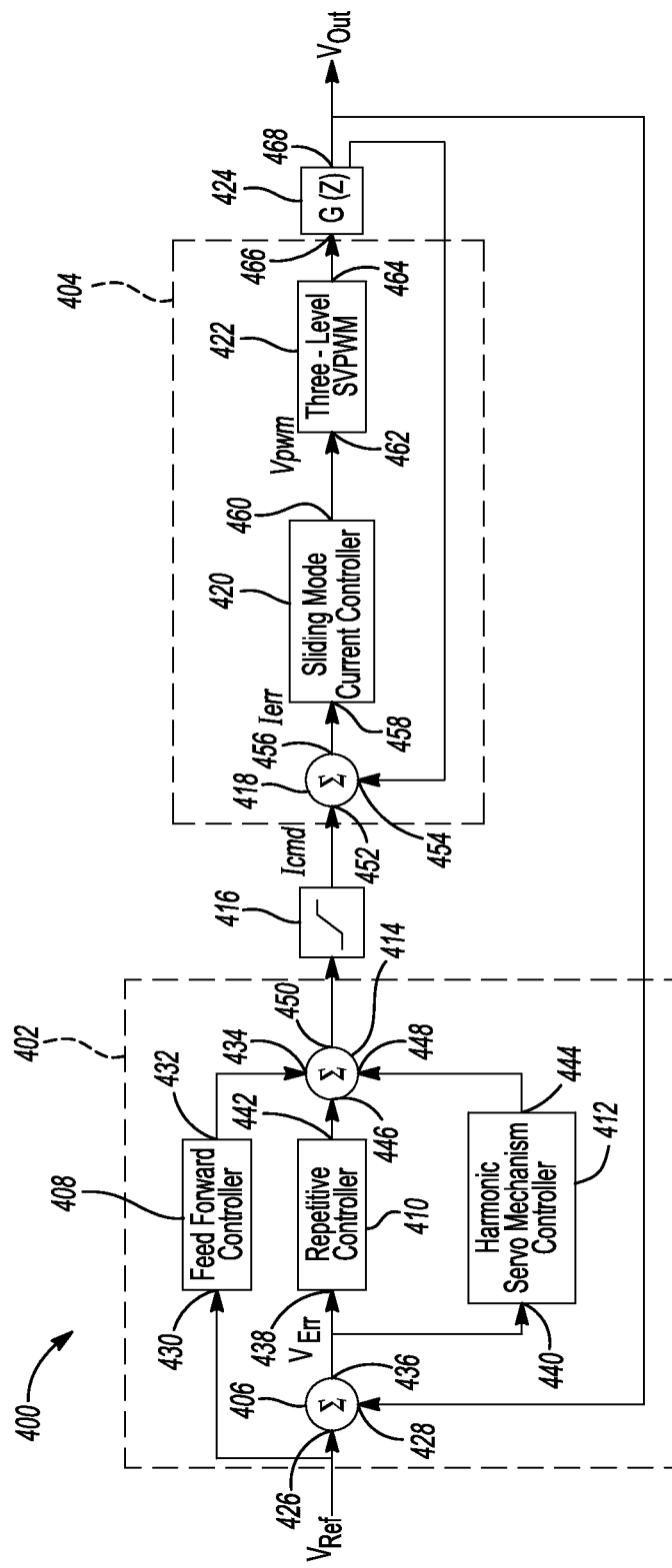
FIG. 4 is a basic block diagram of a repetitive servomechanism controller in accordance with an aspect of the present disclosure.

FIG. 4 is a block diagram of a repetitive servomechanism controller 400 in accordance with an aspect of the present disclosure. This repetitive servomechanism controller has two control loops—an outer control loop 402 and an inner control loop 404. Outer control loop 402 includes an input summer 406, a feed-forward controller 408, a repetitive controller 410, a harmonic servomechanism controller 412, an output summer 414 and a current limiter 416. Inner control loop 404 includes an input summer 418, a sliding mode current controller 420 and a PWM drive signal generator 422.

With reference to outer control loop 402, input summer 406 has a reference signal input 426 at which a reference signal (Vref) is provided and a feedback signal input 428 coupled to a voltage output of inverter 424 (plant G(Z) in FIG. 4). Reference signal (Vref) is also provided to an input 430 of feed-forward controller 408 and an output 432 of feed-forward controller 408 is provided to an input 434 of output summer 414. An output 436 of input summer 406 at which an error signal (Verr) is generated by input summer 406 is coupled to an input 438 of repetitive controller 410 and to an input of harmonic servomechanism controller 412. An output 442 of repetitive controller 410 is coupled to an input 446 of output summer 414 and an output 444 of harmonic servomechanism controller 412 is coupled to an input 448 of output summer 414. Output summer 414 has an output 450 which provides the output of outer control loop 402 which is coupled through current limiter 416 to a reference input 452 of input summer 418 of inner control loop 404 and reference input 452 provides the input of inner control loop 404. A feedback signal input 454 of input summer 418 receives a current feedback signal from inverter 424. An output 456 of input summer 418 is coupled to an input 458 of sliding mode current controller 420 and an output 460 of sliding mode current controller 420 is coupled to an input 462 of PWM drive signal generator 422. An output (or outputs) 464 of PWM drive signal generator 422 at which PWM drive signals are generated to control the switching of the power semiconductor switching devices (not shown in FIG. 4) of inverter 424 are coupled to switching control inputs 466 of these power semiconductor switching devices of inverter 424.

The inner control loop 404 regulates inverter current using a discrete sliding mode current controller, the same as the discrete sliding mode current controller disclosed in U.S. Pat. No. 6,917,124, FIG. 27 and accompanying description in particular. The inner control loop 404 provides fast transient response. It is useful in limiting inverter current in a timely manner to prevent inverter damage by an overload condition. The sliding mode current controller 420 also has zero overshoot, which improves response to load transients. As discussed in U.S. Pat. No. 6,917,124, discrete time system state space equations can be described as: $x(k+1)=A*x(k)+B*u(k)+E*d(k)$; $y(k)=C*x(k)$, where x=[Vinv, Iinv] in dq stationary reference frame, u is the PWM control input to the system, d is load current as disturbance, y is system output, k represents the kth sample, A, B, C, E are the system parameter determined by the system electrical characteristic. Applying discrete-time sliding mode theory and solving the system equations, the resulting PWM voltage command is $u(k)=(CB)^{-1}(Icmd-CA*x(k)-CE*d(k))$.

The outer control loop 402 regulates the inverter voltage using the above discussed repetitive controller 410 having the transfer function of Equation 1 combined with the above discussed harmonic servomechanism controller 412 and feed-forward controller 408. The repetitive controller 410, harmonic servomechanism controller 412 and feed-forward controller 408 are arranged in parallel (with the exception that the Vout feedback is not provided to the feed-forward controller 408), as shown in FIG. 4. The repetitive controller 410 works together with the harmonic servomechanism controller 412 to provide superior harmonic rejection, providing accurate steady state performance and also providing an easier to stabilize controller. The feed-forward controller 408 together with the sliding mode current controller 420 provides fast transient response and current limit for UPS system protection. It should be understood that the repetitive servomechanism controller 400 shown in FIG. 4 is an improvement to the servomechanism controller shown in FIG. 27 of U.S. Pat. No. 6,917,124.

The repetitive servomechanism controller 400 in accordance with above described aspects of the present disclosure provides not only superior harmonic rejection capability, but also better and faster transient performance and more accurate steady state performance. The combination of the repetitive controller 410 with the harmonic servomechanism controller 412 improves the UPS system's output waveform performance, overcoming the disadvantages of the two individual controllers and yields a superior hybrid controller with more robust and reliable performance. In addition, this repetitive servomechanism controller is easier to stabilize with various types of load.

Figure 1:
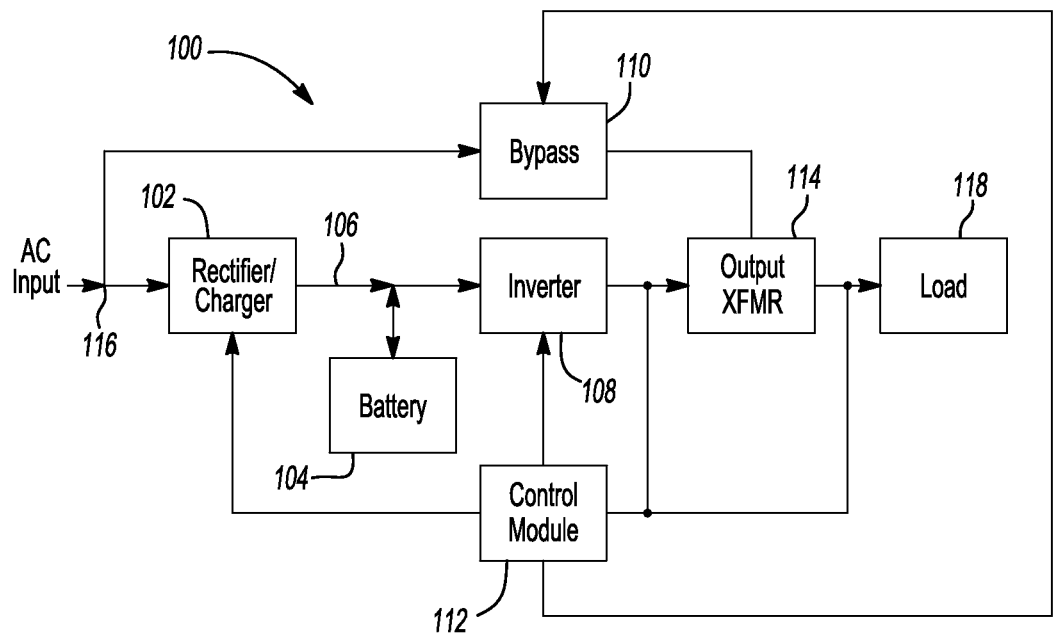
FIG. 1 is a basic block diagram of a prior art UPS system.

The repetitive servomechanism controller 400 may illustratively be implemented in the control module for the USP system, such as control module 112 (FIG. 1). The control module may for example be or include a digital processor (DSP) or microprocessor which are programmed with software implementing the repetitive servomechanism controller. It should be understood that other logic devices can be used, such as a Field Programmable Gate Array (FPGA), a complex programmable logic device (CPLD), or application specific integrated circuit (ASIC).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A repetitive servomechanism uninterruptible power supply system controller, comprising:
an inner control loop that controls output current of an inverter of the uninterruptible power supply system using a discrete sliding mode current controller of the inner control loop with a PWM voltage signal generated at an output of the discrete sliding mode current controller which is coupled to a PWM drive signal generator that generates PWM drive signals for controlling semiconductor switching devices of the inverter with the PWM drive signals each having a duty cycle determined by a level of the PWM voltage signal;
an outer control loop that controls output voltage of the inverter, the outer control loop including a feed-forward controller, a repetitive controller and a harmonic servomechanism controller, an input summer and an output summer, the output summer having inputs coupled to respective outputs of each of the feed-forward controller, the repetitive controller and the harmonic servomechanism controller, an output of the output summer coupled to an input of the inner control loop, the input summer summing an output voltage of the inverter and a reference voltage to generate an error signal that is provided to an input of the repetitive controller and to an input of the harmonic servomechanism controller; and
the feed-forward controller having an input which receives the reference voltage.

2. The repetitive servomechanism uninterruptible power supply system controller of claim 1 wherein the repetitive controller is configured to eliminate all harmonics and a frequency compensator of the harmonic servomechanism controller is configured as a compensator of only fundamental frequency.

3. The repetitive servomechanism uninterruptible power supply system controller of claim 2 wherein the repetitive controller is configured to eliminate all harmonics by having a transfer function defined by an equation $RPC(Z)=Z^{\wedge}(-(N-k))/(1-[(Q(Z)\cdot Z)]^{\wedge}(-N))*Kopt*S(Z)*Z^{\wedge}(-k)$ where $Q(Z)$ is a constant gain smaller than 1, N is a number of samples per cycle at a fixed sample rate, $S(Z)$ is a compensator, Kopt is an optimized gain for best transient and steady state performance of control loop of the repetitive controller, Z is a symbol for Z-transformation, $Z=e^{jwt}$, where, $w=2*\pi*T$, $T=1/fs$ is a sampling period and fs is a sampling rate, and k is a kth number of all samples in a sampling period T.

4. A method of controlling an uninterruptible power supply system with a repetitive servomechanism controller having an inner control loop and an outer control loop, comprising:

controlling an output current of an inverter of the uninterruptible power supply system with the inner control loop using a discrete sliding mode current controller of the inner control loop to generate a PWM voltage signal at an output of the discrete sliding mode current controller which is coupled to a PWM drive signal generator and generating with the PWM drive signal generator PWM drive signals having a duty cycle determined by a level of the PWM voltage signals and controlling semiconductor switching devices of the inverter with the PWM drive signals;

controlling an output voltage of the inverter with the outer control loop by generating an output signal by summing with an output summer outputs of each of a feed-forward controller, a repetitive controller and a harmonic servomechanism controller of the outer control loop and providing the output signal to an input of the inner control loop;

providing a reference voltage to an input of the feed-forward controller; and generating an error signal by summing with an input summer an output voltage of the inverter and the reference voltage and providing the error signal to an input of the repetitive controller and to an input of the harmonic servomechanism controller.

5. The method of claim 4 including eliminating all harmonics with the repetitive controller and compensating only fundamental frequency with a frequency compensator of the harmonic servomechanism controller.

6. The method of claim 5 wherein eliminating all harmonics with the repetitive controller includes having a transfer function of the repetitive controller defined by an equation $RPC(Z)=Z^{\wedge}(-(N-k))/(1-[(Q(Z)\cdot Z)]^{\wedge}(-N))*Kopt*S(Z)*Z^{\wedge}(-k)$ where Q(Z) is a constant gain smaller than 1, N is a number of samples per cycle at a fixed sample rate, S(Z) is a compensator, Kopt is an optimized gain for best transient and steady state performance of control loop of the repetitive controller, Z is a symbol for Z-transformation, $Z=e^{jwt}$, where, $w=2*\pi*T$, $T=1/fs$ is a sampling period and fs is a sampling rate, and k is a kth number of all samples in a sampling period T.

\* \* \* \* \*